(12) United States Patent
Bieber et al.

(10) Patent No.: US 10,620,319 B2
(45) Date of Patent: Apr. 14, 2020

(54) DEVICE AND METHOD FOR GENERATING AND PROVIDING POSITION INFORMATION

(71) Applicant: KATHREIN-WERKE KG, Rosenheim (DE)

(72) Inventors: Robert Bieber, Rosenheim (DE); Markus Mohr, Rosenheim (DE)

(73) Assignee: KATHREIN-WERKE KG, Rosenheim (DE)

( * ) Notice: Subject to any disclaimer, the term of this patent is extended or adjusted under 35 U.S.C. 154(b) by 353 days.

(21) Appl. No.: 15/568,547

(22) PCT Filed: Apr. 26, 2016

(86) PCT No.: PCT/EP2016/059264
§ 371 (c)(1),
(2) Date: Oct. 23, 2017

(87) PCT Pub. No.: WO2016/174018
PCT Pub. Date: Nov. 3, 2016

(65) Prior Publication Data
US 2018/0156919 A1    Jun. 7, 2018

(30) Foreign Application Priority Data

Apr. 29, 2015  (DE) ................. 10 2015 005 465

(51) Int. Cl.
*G01S 19/11* (2010.01)
*G01S 19/01* (2010.01)

(52) U.S. Cl.
CPC ............. *G01S 19/11* (2013.01); *G01S 19/015* (2013.01)

(58) Field of Classification Search
CPC ........ G01S 19/11; G01S 19/015; G01S 19/37; G01S 19/21; G01S 5/02; G01S 5/0289
(Continued)

(56) References Cited

U.S. PATENT DOCUMENTS

2006/0208946 A1   9/2006  Bailey et al.
2015/0301190 A1*  10/2015 Osipov .................. G01S 19/41
                                            342/357.26
(Continued)

FOREIGN PATENT DOCUMENTS

DE    10 2012 007 205    7/2014
EP         2 233 943     9/2010
(Continued)

OTHER PUBLICATIONS

International Search Report for PCT/EP2016/059264 dated Jul. 28, 2016, 3 pages.
(Continued)

*Primary Examiner* — Harry K Liu
(74) *Attorney, Agent, or Firm* — Nixon & Vanderhye, P.C.

(57) ABSTRACT

Individual pieces of position information are used to determine a location using a processor and multiple local position transmitters. The processor is supplied with at least four different navigation signals, each of which corresponds to a satellite signal on the basis of the global navigation satellite system. Each navigation signal contains information on the transmission time and the transmission location. The processor generates at least four modified navigation signals by temporally shifting navigation signals relative to one another such that the target location coordinates which can be obtained therefrom correspond to a target location on the basis of the global navigation satellite system. An analyzer then superimposes the at least four modified navigation signals in order to form a modified summation navigation signal and transmits same to the local position transmitters. The summation navigation signal is calculated individually for each local position transmitter.

26 Claims, 6 Drawing Sheets

(58) Field of Classification Search
USPC .................................................... 342/357.48
See application file for complete search history.

(56) References Cited

U.S. PATENT DOCUMENTS

2016/0292920 A1* 10/2016 Sprock .................... G06T 11/60
2018/0284288 A1* 10/2018 Lentz ...................... G01S 19/22

FOREIGN PATENT DOCUMENTS

| JP | 2005-321353 | 11/2005 |
| WO | WO 97/38326 | 10/1997 |
| WO | WO 2007/030384 | 3/2007 |
| WO | WO 2014/123809 | 8/2014 |

OTHER PUBLICATIONS

English translation of the International Preliminary Report on Patentability and Written Opinion of the International Searching Authority dated Nov. 9, 2017, issued in corresponding International Application No. PCT/EP2016/059264.

* cited by examiner

DEVICE AND METHOD FOR GENERATING AND PROVIDING POSITION INFORMATION

CROSS-REFERENCE TO RELATED APPLICATIONS

This application is the U.S. national phase of International Application No. PCT/EP2016/059264 filed Apr. 26, 2016; which claims priority to German Patent Application No. 10 2015 005 465.1 filed Apr. 29, 2015. The disclosures of these applications are incorporated herein in their entirety by reference.

STATEMENT REGARDING FEDERALLY SPONSORED RESEARCH OR DEVELOPMENT

None.

FIELD

The invention relates to a method and to a device for generating and providing individual pieces of position information for location determination on the basis of the global navigation satellite system (GNSS). The term "global navigation satellite system" includes existing or future global satellite systems for determining location information, such as GPS (global positioning system), GLONASS (global navigation satellite system), Galileo and Beidou.

BACKGROUND AND SUMMARY

For determining position, all known systems work using satellites, which send a navigation signal, containing information regarding the transmission time, the transmission location and the satellite in question, to the earth. Each satellite sends its own specific navigation signal, which differs from the navigation signals of other satellites. The information regarding the transmission time specifies a precise moment at which the signal was broadcast. The same applies to the transmission location. This information contains the precise data of the path on which the satellite is located at the transmission time. By means of at least four satellites, which broadcast different navigation signals, it is possible for a receiver on the earth to be able to calculate its exact location on the basis of transit time differences.

It is problematic that there are many locations in which the navigation signals broadcast by the satellites are not or are only insufficiently received, meaning that the receiver cannot or can only very imprecisely determine its position. In particular, these include the interiors of buildings, such as shopping centres or car parks, as well as tunnels, ravines, caves and narrow streets surrounded by tall houses.

On the one hand, the need for exact position determination is important so as to be able to reach the desired destination by the shortest route. On the other hand, position determination of this type is also desirable in emergency situations so as to be able to communicate the position of the victim to emergency services.

To overcome these problems, location-based navigation is possible in buildings nowadays by means of a wide range of technical solutions. For example, different wireless systems/networks can be used, which are set out for example by WLAN, Bluetooth and corresponding standards. The position of the receiver may for example be determined by triangulation, by way of power measurement and comparison with the communicating signals. It is equally possible to place individual "radio nodes" at particular locations, which make it possible for the receiver to determine its own location in combination with a card specially provided for this region. However, by comparison with the known global navigation satellite systems, these location determination methods require further radio technologies, mathematical methods and thus additional programs, which first for example have to be installed on the receiving device.

For these reasons, solutions are being created which also make location determination possible outside the direct GNSS coverage region. EP 2 233 943 A1 discloses a method for providing position information by means of an interior transmitter. The interior transmitter receives superposed navigation signals of a plurality of satellites, which have been recorded by a receiver outside a building. In addition to the received navigation signals, the interior transmitter receives a further piece of information specifying its own location. From the received navigation signals and its own location, the interior transmitter calculates a modified position signal as a sum of individual navigation signals as a function of the location of the receiver, and broadcasts said modified position signal.

The drawbacks of EP 2 233 943 A1 are that at least four individual navigation signals have to be conveyed to the interior transmitter and that the interior transmitter itself has to process these navigation signals further so as ultimately to broadcast a navigation signal which passes on the location of the interior transmitter using a receiving device. For this purpose, complex and thus expensive interior transmitters are required.

The object is therefore to provide a method and device by means of which exact location determination is possible, in as simple and cost-effective a manner as possible, at locations at which direct reception of navigation signals from navigation satellite systems is not possible.

For the method for generating and providing individual position information for location determination on the basis of the global navigation satellite system, the object is achieved by the features of claim 1. Further, for the device for generating and providing individual position information for location determination on the basis of the global navigation satellite system, the object is achieved by the features of claim 14. In the associated dependent claims, advantageous developments of the method according to the invention and of the device according to the invention are set out.

The method according to the invention and the device according to the invention for generating and providing individual position information for location determination on the basis of the global navigation satellite system provides employing or using a preparation unit and at least two or at least three or at least four or at least five local position transmitters, the local position transmitters being connected to the preparation unit. Preferably at least four different navigation signals are supplied to the preparation unit, each of which corresponds to a satellite signal on the basis of the global navigation satellite system. Preferably, each of these at least four different navigation signals at least includes information regarding the transmission time and transmission location. The preparation unit is formed to generate at least four target-location-dependent navigation signals by time-shifting at least two, three or preferably all four different navigation signals, the target location coordinates which can be achieved as a result, in other words the position information on the basis of the global navigation satellite system, corresponding to the target location, which may be selected as desired. These at least four target-location-dependent navigation signals are superposed by the preparation unit to form a modified summed navigation signal, and are conveyed to the associated local position transmitter. For each of the local position transmitters, an individual summed navigation signal is generated. It is particularly advantageous for a modified summed navigation signal which is transmitted to the at least one local position transmitter to be generated centrally, in other words by the preparation unit. This makes it possible for the central position transmitter to be able to consist solely of an omnidirectional antenna in the simplest case. Preferably, the summed navigation signal is a digital signal, and so the local position transmitter includes at least one D/A convertor and optionally an amplifier. The digital summed navigation signal can thus be transmitted via known, in particular wired communications channels, such as Ethernet (LAN/Internet), using known protocols. Some or all of the local position transmitters may jointly use some of the transmission paths. This means that some of the individual summed navigation signals are transmitted to the local position transmitters via the same communications channel. As a result, a pre-existing infrastructure can be used, or the costs of constructing a new infrastructure can be kept to a minimum. The local position transmitters may therefore be made very compact and cost-effective.

This construction according to the invention is also in complete contrast to the construction of DE 10 2012 007 205 B5. This document teaches decentralised generation of the target-location-dependent navigation signals. The target-location-dependent navigation signals are generated wherever they are to be broadcast from. This document teaches the use of a position transmitter (pseudolite), which is for supplying a region having limited reception of GNSS navigation signals. The pseudolite shown comprises a signal generation unit having corresponding amplifiers and exactly one antenna. The signal generation unit generates at least three signals, which are modelled on GNSS navigation signals from satellites, and broadcasts these signals using the antenna. No digital superposition of the individual target-location-dependent navigation signals takes place. The pseudolite is installed directly where reception is desired, as an independently operating unit. This means that a pseudolite has to be placed for each target location. Transmission of the target-location-dependent navigation signals via communications networks, either pre-existing or to be newly set up, is not provided. The approach for providing GNSS position information is thus exactly the reverse of that according to the present invention, and is not an economical and scalable solution for multiple target locations.

Further, in the present invention, it is also not necessary for all navigation signals to be time-shifted. Specifically, depending on the satellite arrangement, it may in some cases occur that the position of the target location has only changed with respect to three or even only with respect to two of the at least four satellites.

Further, in the method according to the invention and the device according to the invention, it is advantageous if the target location is a location which is in radio range of the associated local position transmitter ($3_1, 3_2, 3_3, \ldots, 3_n$). The fact that the target coordinates correspond to a target location which is solely in radio range of the at least one local position transmitter makes it possible for the target coordinates for example to represent the centre of a room, the local position transmitter being arranged at the edge of the room. As a result, the maximum deviation of the measured position from the actual position of the receiver is reduced.

Further, it is advantageous if the method according to the invention and the device according to the invention provide selecting at least four satellites, which are in orbit above the location of the connected position transmitter, and if at least four real satellite signals are received from these at least four selected satellites. Alternatively, it is also possible for at least four artificial satellite signals to be generated which are modelled on the real satellite signals of the at least four selected satellites. The at least four received real or at least four received generated satellite signals are navigation signals which are also broadcast by the selected satellites. It is also possible for both real satellite signals and artificially generated satellite signals to be used jointly, in other words mixed together, as long as there are at least four different satellite signals in total. These satellite signals, which are the navigation signals, are supplied to the preparation unit for further processing. It is particularly advantageous that it is possible to select at least four satellites which are located in orbit above the location of the local position transmitter. This means that a direct line of sight between these satellites and the location of the at least one position transmitter would be possible if for example there were no building structures in the way. The satellites are therefore in the field of vision of the local position transmitter. As a result, the local position transmitters can broadcast navigation signals modelled on those which a receiver at the position of the local position transmitter would also have received if the navigation signals of these satellites were received directly. This prevents "confusion" of the receiving device (for example a GPS receiver), which for example had direct satellite reception before entering a building. If a receiving device of this type suddenly received completely different satellites, the functionality thereof would potentially no longer be provided for a period of for example several minutes.

Further, in the method according to the invention and in the device according to the invention, it is advantageous if a selection unit solely selects the satellites which are furthest away from one another and/or which broadcast a satellite signal which is incident on the ground at an angle of more than 5°, preferably more than 10°, more preferably more than 20° at the location of the local position transmitter. This ensures that a receiving device, by means of the modified summed navigation signal broadcast by the local position transmitter, obtains position details, by means of which the altitude of the location can also be exactly determined. It is advantageous that it is made possible for the selection unit not to select satellites of which the satellite signals (or navigation signals) are incident on the ground at an angle of less than 20° or less than 10° or less than 5° at the location of the local position transmitter. Receiving devices such as GPS receivers often would not make use of satellites of this type for position determination because such a shallow angle of incidence in reality generally leads to fading. By way of the selection unit, it is also possible only to select a limited number of satellites which are in orbit vertically or almost vertically above the target location. For example, it can be determined that of the at least four selected satellites there can only be one which is in orbit vertically or almost vertically above the target location. This provides that the preparation unit carries out further processing solely of navigation signals which would also use a receiving device for position determination.

In addition, in the method according to the invention and the device according to the invention, it is advantageous if information regarding a transmission location in the summed navigation signal of the at least four satellites is no more than 5 minutes old, preferably no more than 3 minutes old, more preferably no more than 1 minute old, more preferably no more than 30 seconds old. It is particularly advantageous if the modified summed navigation signal broadcast by each local position transmitter contains location data of the satellites in the form of ephemerides which approximate the actual location of the satellite at the time of broadcast of the modified summed navigation signal as closely as possible. The ephemerides make it possible to draw a conclusion as to the exact position of the satellite, and contain for example the path data of the satellites. Outdated information regarding the location of the satellite can result in some receivers not making use of these satellites for location determination. This problem occurs in particular if a receiving device alternates between directly receiving navigation signals and indirectly receiving navigation signals. "Directly receiving" means that the receiving device obtains navigation signals directly by way of the global navigation satellite system, whilst "indirectly receiving" means that the receiving device obtains navigation signals in the form of modified summed navigation signals which are broadcast for example by the at least one local position transmitter.

Further, in the method according to the invention and the device according to the invention, it is advantageous if a receiving unit is provided, which receives the at least four real satellite signals of the at least four selected satellites, and if this receiving unit is connected to the preparation unit, the at least one receiving unit being a directional antenna and/or an antenna array and/or a mirror and/or a microwave lens, or the receiving unit being a signal generator. In particular, the use of a directional antenna and/or an antenna array and/or a mirror and/or a microwave lens makes interference-free reception of real satellite signals possible, in other words real navigation signals which are preferably not superposed with other signals. The use of a signal generator makes it possible for an artificial satellite signal, in other words an artificial navigation signal modelled on the real satellite signals of the at least four selected satellites, to be able to be generated.

Further, it is advantageous if the method according to the invention and the device according to the invention has at least four antenna arrays and/or at least four directional antennas and/or at least four mirrors and/or at least four microwave lenses, and if a control unit is present which directs and tracks these four antenna arrays and/or the at least four directional antennas and/or the at least four mirrors and/or the at least four microwave lenses onto the selected at least four satellites. Each of the at least four antenna arrays may for example be orientated and tracked onto an associated one of the at least four selected satellites by beamforming. If directional antennas and/or mirrors and/or microwave lenses are used, this is still possible by means of an orientating and tracking unit, which preferably comprises stepper motors. It is particularly advantageous that individual satellite signals, in other words individual navigation signals, are present at the location of the receiving unit, and not a summed navigation signal, which would have to be divided up again. The individual satellite signals, in other words the individual navigation signals, can if required be amplified and supplied to the preparation unit separately. The preparation unit can in this case time-shift the individual navigation signals individually and subsequently superpose them, and thus supply an individually generated summed navigation signal to the local position transmitters.

It is further advantageous according to the invention if the method and the device comprise a GNSS receiver which is connected to the control unit and which conveys location data, in other words an almanac and/or ephemerides, for the at least four selected satellites to the control unit. This makes it possible for the control unit to exactly direct and exactly track each receiver onto the corresponding satellite. It is further advantageous if, for the at least four selected satellites, location data from a memory unit connected to the control unit are conveyed thereto. A memory unit of this type may be a local database or one which is accessible over the Internet and by way of which the current path data, in other words the location data of the satellites, can be queried in real time. It is thus possible for the control unit to direct the receivers exactly onto the associated satellites.

In addition, in the method according to the invention and in the device according to the invention, it is advantageous if at least one of the local position transmitters is part of a transceiver unit which in turn is part of a mobile radio base station and/or if the connection between the preparation unit and at least one of the local position transmitters is a connection which provides the transceiver unit of a mobile radio base station with data. Preferably, the local position transmitters are at least in part connected to the preparation unit via a jointly used (in particular wired) data connection, such as Ethernet. This makes possible simple integration of a local position transmitter into an existing mobile radio network, which for example is constructed inside buildings and provides reception therein, or into a pre-existing network topology. Pre-existing lines and/or antennas may also be used for conveying position data, in other words the modified summed navigation signal.

Finally, in the method according to the invention and the device according to the invention, it is advantageous if the selection unit for generating the modified summed navigation signal selects satellites which are different, entirely or at least in part, for the first local position transmitter and for each further local position transmitter. As a result, regions in which the local position transmitters broadcast the modified summed navigation signal can also overlap in part without fading occurring. This is because the local position transmitters broadcast disjoint summed navigation signals, meaning that a plurality of local position transmitters can coexist without cancellation occurring, in other words superposition of like signals having a different phase. By contrast, if a single local position transmitter is used, cancellations and thus dead spots may occur as a result of reflections. In this case, it would be advantageous for the local position transmitter to have a plurality of antennas, the intention being for the modified summed navigation signal to be broadcast via the various antennas in turn, or for an individual modified summed navigation signal to be conveyed to the local position transmitter for each antenna, it being intended for the satellites selected for each modified summed navigation signal to be different entirely or in part.

BRIEF DESCRIPTION OF THE DRAWINGS

Different embodiments of the invention are described by way of example in the following, referring to the drawings. Like subject matter has like reference numerals. In the corresponding drawings, in detail.

DETAILED DESRIPTION OF NON-LIMITING EMBODIMENTS

Figure 1:
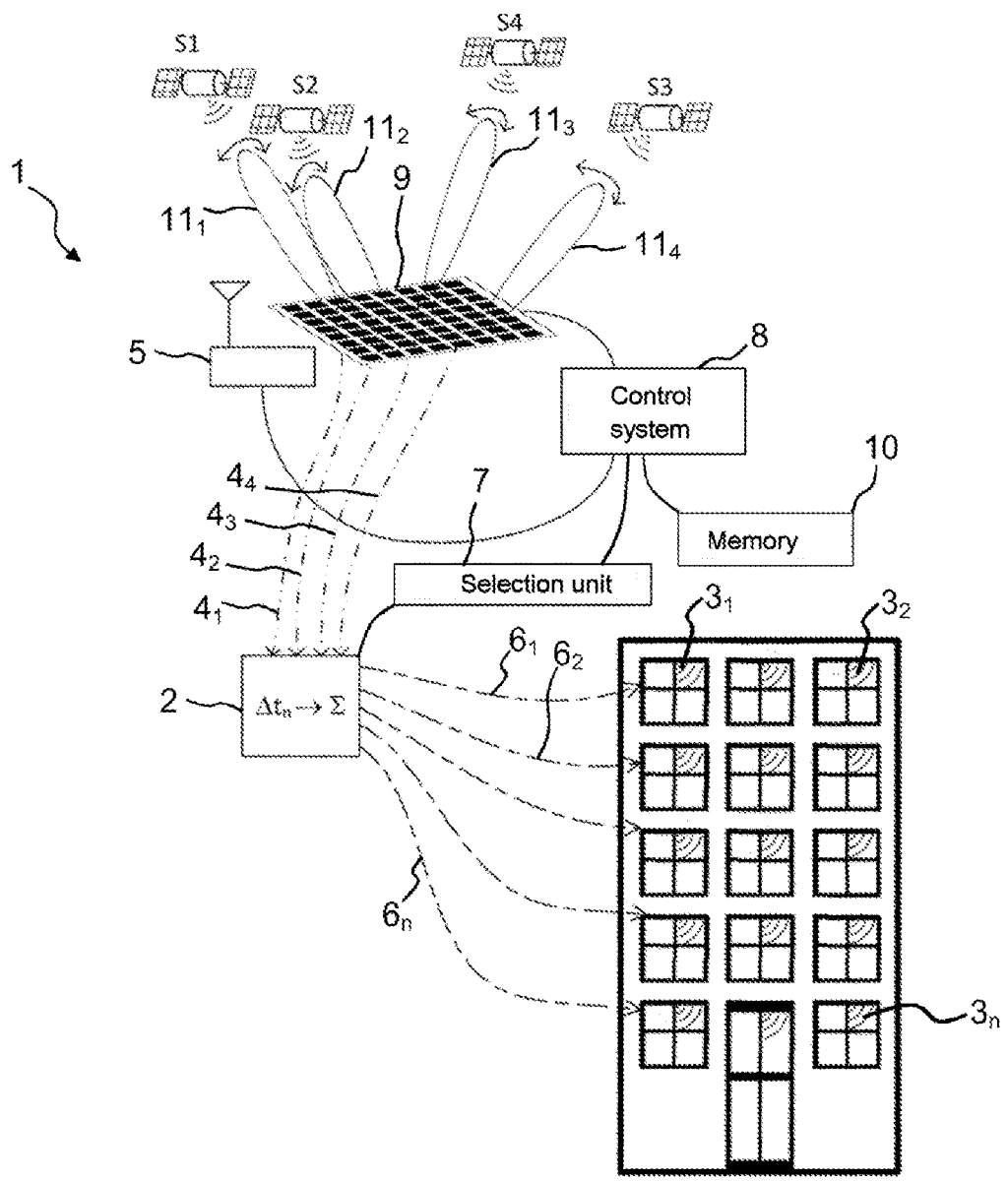
FIG. 1 is an overview circuit diagram of the device according to the invention for generating and providing individual pieces of position information for location determination.

FIG. 1 is an overview circuit diagram of the device 1 according to the invention for generating and providing individual position information for location determination. The device 1 comprises at least one preparation unit 2 and at least one local position transmitter $3_1$, $3_2$, ..., $3_n$. Preferably, at least two or at least three or at least four or at least five local position transmitters $3_1$, $3_2$, ..., $3_n$ are used. Preferably, the local position transmitters $3_1$, $3_2$, ..., $3_n$ are "active" position transmitters $3_1$, $3_2$, ..., $3_n$, which further have a D/A converter and optionally an amplifier and optionally a filter. The preparation unit 2 is connected to the local position transmitters $3_1$, $3_2$, ..., $3_n$. This connection may for example take place digitally via existing IT infrastructures, such as Ethernet, or else via further networks in other technologies. The connection may also be a connection which also supplies transceiver units, which are part of a mobile radio base station, with data. Preferably, a communications-orientated connection is used. An analogous connection via coaxial lines and/or fibre optic cables is also possible.

At least four different navigation signals $4_1$, $4_2$, $4_3$, $4_4$ are supplied to the preparation unit 2, each of which basically corresponds to a satellite signal on the basis of the global navigation satellite system. Each of these four different navigation signals $4_1$, $4_2$, $4_3$, $4_4$ preferably contains information regarding the transmission time, the transmission location and the satellite S1, S2, S3, S4 itself. The information regarding the transmission location includes for example the ephemeris data and optionally also the almanac data. The ephemeris data specify the exact path, in other words the exact location of the satellite, where it is to be found in orbit. The almanac data also include additional rough position specifications for the satellite generally located in orbit above the location of the at least one local position transmitter $3_1$, $3_2$, ..., $3_n$. The term "orbit" refers to the region of the sky in which the GNSS satellites S1, S2, S3, S4 move and in which the GNSS satellites S1, S2, S3, S4 broadcast a satellite signal which can be received by the receiving device on the ground. Preferably, the satellite signal is incident on a point on the ground at an angle of more than 5°, preferably of more than 10°, more preferably of more than 20°. A GNSS receiver 5 or a receiving device in general can therefore receive a satellite signal from satellites S1, S2, S3, S4 which are located in orbit above the location thereof. "Location" means that the satellites S1, S2, S3, S4 have a line of sight to the GNSS receiver 5, or would have one if no obstacles such as houses were in the way. The satellite signals, in other words navigation signals $4_1$, $4_2$, $4_3$, $4_4$, broadcast by the satellites S1, S2, S3, S4 are received by the receiving devices. Using transit time differences between the mutually synchronised satellite signals and the known position of the satellites S1, S2, S3, S4 in orbit, the current position can be determined. This is achieved using the non-linear equation system below:

$$(x_1-x_0)^2+(y_1-y_0)^2+(z_1-z_0)^2=[c(t_1-t_0)]^2 \quad (1)$$

$$(x_2-x_0)^2+(y_2-y_0)^2+(z_2-z_0)^2=[c(t_2-t_0)]^2 \quad (2)$$

$$(x_3-x_0)^2+(y_3-y_0)^2+(z_3-z_0)^2=[c(t_3-t_0)]^2 \quad (3)$$

$$(x_4-x_0)^2+(y_4-y_0)^2+(z_4-z_0)^2=[c(t_4-t_0)]^2 \quad (4)$$

This equation system describes the situation where the signals of for example four satellites are received, having coordinates $S1(x_1, y_1)$, $S2(x_2, y_2, z_2)$, $S3(x_3, y_3, z_3)$ and $S4(x_4, y_4, z_4)$. The individual time delays $\Delta t_1$, $\Delta t_2$, $\Delta t_3$, $\Delta t_4$ which are required for target-location-dependent mapping can be determined by solving this equation system for the target location $(x_0, y_0, z_0)$.

All of the satellites S1, S2, S3 and S4 are GNSS satellites S1, S2, S3 and S4 which broadcast a satellite signal which is used by GNSS receivers 5 or general receiving devices for position determination.

The navigation signals $4_1$, $4_2$, $4_3$, $4_4$ supplied to the preparation unit 2 are modified thereby in such a way that at least four target-location-dependent navigation signals are generated, the target location coordinates obtainable therefrom, in other words the position information on the basis of the global navigation satellite system, correspond for example to the location of the at least one local position transmitter $3_1$, $3_2$, ..., $3_n$. This means that, for mapping a location (target location) into the mapping space of a GNSS system in a manner in accordance with the invention, individual satellite signals, in other words navigation signals $4_1$, $4_2$, $4_3$, $4_4$, are delayed or (time-)shifted relative to one another in accordance with the target location coordinates in such a way that the modified summed navigation signal $6_1$, $6_2$, ..., $6_n$, in other words the superposition of the shifted individual signals, corresponds to the target location. It is not necessary for all of the at least four satellite signals, in other words all of the navigation signals $4_1$, $4_2$, $4_3$, $4_4$, to be time-shifted. Depending on the current position of the satellites S1, S2, S3 and S4 in orbit, it may in some cases occur that the target location has only changed in relation to two or three of the at least four satellites S1, S2, S3 and S4, and therefore only the navigation signals $4_1$, $4_2$, $4_3$, $4_4$ for these satellites have to be time-shifted.

The target location, which is obtained from the position determination using the received modified summed navigation signal $6_1$, $6_2$, ..., $6_n$, need not necessarily correspond to the location at which the at least one local position transmitter $3_1$, $3_2$, ..., $3_n$ is located. For example, the target location of the mapping may be defined in spatial terms in the centre of a room so as to increase the accuracy of the location determination.

The preparation unit 2 further superposes the at least four target-location-dependent navigation signals to form a modified summed navigation signal $6_1$, $6_2$, ..., $6_n$. A modified summed navigation signal $6_1$, $6_2$, ..., $6_n$ is supplied to exactly one local position transmitter $3_1$, $3_2$, ..., $3_n$. This means that the preparation unit 2 generates the modified summed navigation signal $6_1$, $6_2$, ..., $6_n$ individually for each local position transmitter $3_1$, $3_2$, ..., $3_n$. The individual navigation signals $4_1$, $4_2$, $4_3$, $4_4$ containing the transmission times are time-shifted individually, on the basis of the location of the local position transmitter $3_1$, $3_2$, ..., $3_n$ in each case. Naturally, the target location coordinates on the basis of the global navigation satellite system of the modified summed navigation signal $6_1$, $6_2$, ..., $6_n$ may also correspond to a target location which is in radio range of the at least one local position transmitter $3_1, 3_2, \ldots, 3_n$. This means that the preparation unit 2 is formed to generate an individually adapted, modified summed navigation signal $6_1, 6_2, \ldots, 6_n$ for each connected local position transmitter $3_1, 3_2, \ldots, 3_n$. The location of the local position transmitter $3_1, 3_2, \ldots, 3_n$ is known to the preparation unit 2, as is the region in which the local position transmitter $3_1, 3_2, \ldots, 3_n$ can be received by a receiving device. The target location may also in principle be selected as desired, and independently of the actual position of the local position transmitter $3_1, 3_2, \ldots, 3_n$.

The device 1 according to the invention also further comprises a selection unit 7, a control unit 8 and at least one receiving unit 9. The preparation unit 2 is connected to the selection unit 7. The receiving unit 9, which is suitable for receiving satellite signals, is also connected to the preparation unit 2. The receiving unit 9 is controlled by a control unit 8, to which it is connected and which is described further in the following. The selection unit 7 is also connected to the control unit 8. The control unit 8 is optionally further connected to a GNSS receiver 5. The connections are preferably wired.

The selection unit 7 is formed to select at least four satellites S1, S2, S3, S4 which are in orbit above the location of the at least one local position transmitter $3_1, 3_2, \ldots, 3_n$. The selection unit 7 obtains the information as to which satellites S1, S2, S3, S4 can be selected for example from the GNSS receiver 5. The GNSS receiver 5 is arranged in such a way that it can directly receive the satellite signals of the satellites S1, S2, S3, S4 located in orbit, in other words in the field of vision above the location thereof. For example, the GNSS receiver 5 is attached to the roof of a building. Using the received satellite signals, the GNSS receiver 5 can determine which satellites S1, S2, S3, S4 are actually located in the field of vision. For this purpose, it evaluates the almanac data, among other things. The GNSS receiver 5 conveys the information as to the satellites S1, S2, S3, S4 located in orbit above the location thereof and the location of said satellites to the selection unit 7. In the embodiment of FIG. 1, this information is conveyed to the selection unit 7 indirectly via the control unit 8. However, the GNSS receiver 5 may also convey the information to the selection unit 7 directly.

Optionally or alternatively, the selection unit 7 is further connected to a storage unit 10. The storage unit 10 is a local database or one which can be reached via the Internet. The locations of the satellites S1, S2, S3, S4, which are to be seen in orbit above the location of the at least one local position transmitter $4_1, 4_2, 4_3, 4_4$ at a particular time, at an exact time are entered in the database. This information, which is for example almanac data or the more exact ephemeris data, is transmitted to the selection unit 7.

The selection unit 7 preferably selects the satellites which are furthest away from one another. A receiving device can determine its position most precisely in this manner. This applies in particular to the altitude information at the location of the at least one position transmitter $3_1, 3_2, \ldots, 3_n$. The selection unit 7 may also solely select those of the at least four satellites S1, S2, S3, S4 which are broadcasting a satellite signal which is incident on the ground at an angle of more than 5°, preferably of more than 10° and more preferably of more than 20°, at the location of the local position transmitter $3_1, 3_2, \ldots, 3_n$. As explained above, some receiving devices do not take into account satellite signals which are incident at too shallow an angle, because this often leads to fading, meaning that highly exact measurements are not possible. No satellites S1, S2, S3, or only a few, which are located almost vertically or perpendicularly above the location of the local position transmitter $3_1, 3_2, \ldots, 3_n$ should be selected.

The selection unit 7 also preferably selects those satellites S1, S2, S3, S4 which are arranged as uniformly as possible with respect to one another. "Arranging as uniformly as possible" means that the selected at least four satellites S1, S2, S3, S4 are arranged at the corners of a rectangle, in particular of a square. For example, preferably those satellites for which the area of the rectangle is greatest may be selected. The satellites S1, S2, S3, S4 may also be located at the corners of a cube or of a triangular pyramid.

The selection unit 7 notifies the control unit 8 and optionally the preparation unit 2 as to the at least four selected satellites S1, S2, S3, S4. The receiving unit 9 detects the satellite signals of the at least four satellites S1, S2, S3, S4 selected by the selection unit 7 and passes these on to the preparation unit 2. The receiving unit 9 therefore preferably passes on four individual satellite signals, in other words four individual navigation signals $4_1, 4_2, 4_3, 4_4$ to the preparation unit 2, preferably in parallel. These four individual navigation signals $4_1, 4_2, 4_3, 4_4$ are preferably not overlapping navigation signals. The preparation unit 2 time-shifts the individual navigation signals $4_1, 4_2, 4_3, 4_4$ in such a way that a resulting modified summed navigation signal $6_1, 6_2, \ldots, 6_n$ reflects the target location of the corresponding at least one local position transmitter $3_1, 3_2, \ldots, 3_n$. The modified summed navigation signal $6_1, 6_2, \ldots, 6_n$ may also reflect a target location which is located in radio range of the local position transmitter $3_1, 3_2, \ldots, 3_n$ or which is selected as desired, it being necessary for the navigation signals $4_1, 4_2, 4_3, 4_4$ of the selected satellites S1, S2, S3, S4 to be receivable at this time at the actual target location, which corresponds to the selected target location.

It would also be possible for the at least one receiving unit 9 to pass on a summed navigation signal, which includes a superposition of the individual navigation signals $4_1, 4_2, 4_3, 4_4$ of the at least four selected satellites S1, S2, S3, S4, to the preparation unit 2. A summed navigation signal of this type would be decoded into the individual navigation signals $4_1, 4_2, 4_3, 4_4$ by the preparation unit 2. Subsequently, the individual navigation signals $4_1, 4_2, 4_3, 4_4$ would be time-shifted in accordance with one another.

Preferably, however, no summed navigation signal is passed on to the preparation unit 2 by the at least one receiving unit 9. Instead, the at least one receiving unit 9 comprises at least four antenna arrays and/or at least four directional antennas and/or at least four mirrors and/or at least four microwave lenses. The control unit 8 is formed to orientate and track the at least four antenna arrays and/or the at least four directional antennas and/or the at least four mirrors and/or the at least four microwave lenses onto the at least four satellites S1, S2, S3, S4 selected by the selection unit 7. Tracking of this type is necessary, since the GNSS satellites S1, S2, S3, S4 are not geostationary satellites. This means that the position of the GNSS satellites S1, S2, S3, S4 constantly changes, the exact path data being supplied by way of the ephemeris data of the control unit 8.

If the at least one receiving unit 9 consists of at least four antenna arrays, the control unit 8 is formed in such a way that it directs and tracks each of the at least four antenna arrays onto an associated one of the at least four satellites S1, S2, S3, S4 selected by the selection unit 7, by beamforming. This means that a beam $11_1$ of the antenna array is orientated exactly onto one of the at least four selected satellites S1, S2, S3, S4. A second beam $11_2$ of a further antenna array is orientated onto a second satellite S2. The same applies to a third beam $11_3$ and a fourth beam $11_4$ of the further antenna arrays, which are orientated onto a third and fourth satellite S3, S4, respectively. This type of tracking takes place exclusively electronically, and is therefore independent of any weathering effects.

It is also possible for the receiving unit 9 to comprise at least four directional antennas and/or at least four mirrors and/or at least four microwave lenses. It is orientated mechanically, for example using an orientation and tracking unit (not shown), which may comprise a plurality of stepper motors. By way of these stepper motors, the at least four directional antennas and/or the at least four mirrors and/or the at least four microwave lenses can be orientated in space.

It is important that the modified summed navigation signal $6_1, 6_2, \ldots, 6_n$ generated by the preparation unit 2 contains valid data. The term "valid data" means that the individual navigation signals $4_1, 4_2, 4_3, 4_4$ supplied to the preparation unit 2 contain information, such as the transmission time, the transmission location and the satellite S1, S2, S3, S4, which is no more than five minutes old, more preferably no more than three minutes old, more preferably no more than one minute old, more preferably no more than 30 seconds old. This means that the navigation signals $4_1, 4_2, 4_3, 4_4$ supplied to the preparation unit 2 correspond to the navigation signals $4_1, 4_2, 4_3, 4_4$ broadcast by the satellites S1, S2, S3 and S4, which may have been received at the location of the local position transmitter $3_1, 3_2, \ldots, 3_n$ in direct reception less than 30 seconds ago, or less than one or three or five minutes ago. The modified summed navigation signal $6_1, 6_2, \ldots, 6_n$, which is broadcast by the at least one local position transmitter $3_1, 3_2, \ldots, 3_n$, corresponds to that which would be receivable directly from the satellites S1, S2, S3, S4 at the location of the local position transmitter $3_1, 3_2, \ldots, 3_n$ or in radio range of the local position transmitter $3_1, 3_2, \ldots, 3_n$ and thus in the vicinity of the local position transmitter $3_1, 3_2, \ldots, 3_n$ if there were no obstacles in the way.

These "valid data" include the ephemeris data, almanac data and position data as partial information of the navigation signals $4_1, 4_2, 4_3, 4_4$.

The radio range of the local position transmitter $3_1, 3_2, \ldots, 3_n$ preferably corresponds to the volume of the space supplied by the local position transmitter $3_1, 3_2, \ldots, 3_n$.

The time shifts in the individual navigation signals $4_1, 4_2, 4_3, 4_4$ with respect to one another, which are required for generating the modified summed navigation signal $6_1, 6_2, \ldots, 6_n$, are generated afresh preferably every 5 minutes, more preferably every 3 minutes, more preferably every minute, more preferably every 30 seconds in the preparation unit 2.

This means that a receiver which, from the outside, enters a building in which at least one local position transmitter $3_1, 3_2, \ldots, 3_n$ is installed does not notice any difference between the currentness of the received navigation signals $4_1, 4_2, 4_3, 4_4$ outside and inside the building.

Figure 2:
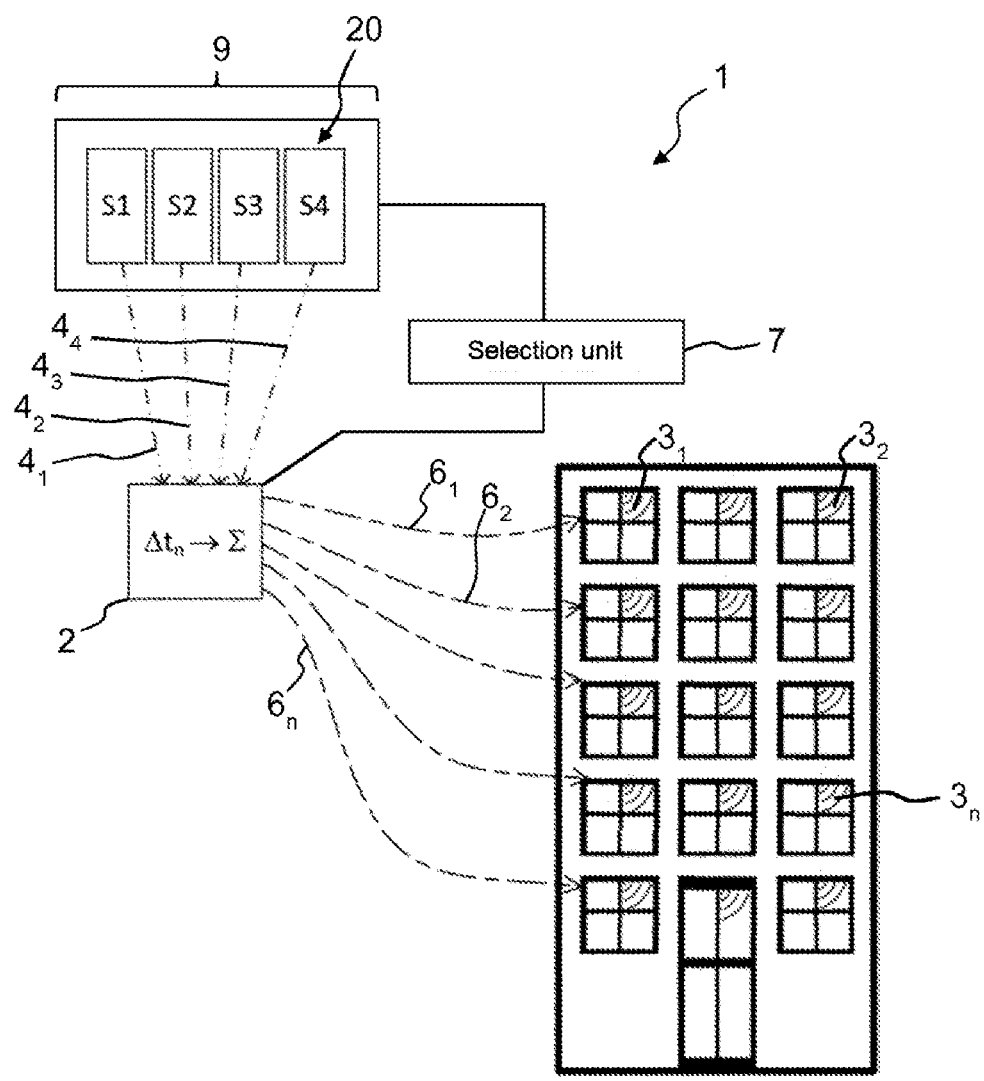
FIG. 2 is a further overview circuit diagram of the device according to the invention for generating and providing individual pieces of position information for location determination.

The modified summed navigation signals $6_1, 6_2, \ldots, 6_n$ generated by the preparation unit 2 and broadcast by the at least one local position transmitter $3_1, 3_2, \ldots, 3_n$ are preferably synchronised with the satellite signals which, outside a building, can be received directly from the satellites S1, S2, S3, S4. In this context, the modified summed navigation signal $6_1, 6_2, \ldots, 6_n$ is made as similar as possible to that which would be receivable directly, for example outside the building. This reduces the possibility that a receiving device, for example a GPS receiver, will suffer performance losses due to unusual signal properties. For this purpose, the preparation unit 2 has the option of compensating system-inherent signal transit times due to the signal transmission from the location of the signal generation, in other words the location of the preparation unit 2, to the broadcast location, in other words the location of the at least one local position transmitter $3_1, 3_2, \ldots, 3_n$. For this purpose, when the modified summed navigation signal is generated, a time slightly in the future is selected. This is at least the time required for the signal generation and for the longest signal transit time of the modified summed navigation signal to the local position transmitter $3_1, 3_2, \ldots, 3_n$. For this purpose, the individual navigation signals $4_1, 4_2, 4_3, 4_4$ should be generated artificially, for example using a signal generator 20, such as is shown in FIG. 2. As a result of this measure, a normal receiver which moves into a building from outside it does not detect that it no longer has direct reception of the satellite signals, but solely still receives the modified summed navigation signals $6_1, 6_2, \ldots, 6_n$ which are being broadcast via the at least one local position transmitter $3_1, 3_2, \ldots, 3_n$.

To reduce the dead spots caused by fading, disjoint sets each of at least four target-location-dependent navigation signals can be broadcast to a plurality of mutually spatially separated antennas of the at least one local position transmitter $3_1, 3_2, \ldots, 3_n$ (diversity). The dead spots have an extent of approximately one wavelength, and are distributed in an interference pattern which is highly dependent on the transmitting antenna position. With some trade-offs, diversity can also be generated by switching the modified summed navigation signal $6_1, 6_2, \ldots, 6_n$ to be broadcast to a plurality of mutually spatially separated antennas of the at least one local position transmitter $3_1, 3_2, \ldots, 3_n$ by time-multiplexing. Preferably, each of the plurality of antennas of the local position transmitter $3_1, 3_2, \ldots, 3_n$ in turn transmits the modified summed navigation signal $6_1, 6_2, \ldots, 6_n$ for a particular time, for example for more than 100 milliseconds or for more than 200 milliseconds or for more than 300 milliseconds but for less than 10 seconds, while the other antennas of the at least one local position transmitter $3_1, 3_2, \ldots, 3_n$ are not broadcasting.

FIG. 2 is a further overview circuit diagram of the device 1 according to the invention for generating and providing individual pieces of position information for location determination. The preparation unit 2 is shown, and is connected to a plurality of local position transmitters $3_1, 3_2, \ldots, 3_n$. In the embodiment of FIG. 2, the local position transmitters $3_1, 3_2, \ldots, 3_n$ are installed inside a building. Preferably, a local position transmitter $3_1, 3_2, \ldots, 3_n$ of this type is installed in each room. In larger rooms, a plurality of local position transmitters $3_1, 3_2, \ldots, 3_n$ may also be installed inside the room, these being at a distance from one another. To prevent problems due to fading, the selection unit 7 selects satellites S1, S2, S3, S4 which are different entirely or at least in part for generating the modified summed navigation signal $6_1, 6_2, \ldots, 6_n$ for the first local position transmitter $3_1, 3_2, \ldots, 3_n$ and for each further local position transmitter $3_1, 3_2, \ldots, 3_n$.

In the embodiment of FIG. 2, the preparation unit 2 is also connected to a receiving unit 9. However, the receiving unit 9 is at least one signal generator 20. By means of this signal generator 20, it is possible to generate at least four artificial satellite signals $4_1, 4_2, 4_3, 4_4$ modelled on the real satellite signals $4_1, 4_2, 4_3, 4_4$ of the at least four selected satellites S1, S2, S3, S4 which are in orbit above the location of the at least one local position transmitter $3_1, 3_2, \ldots, 3_n$. For this purpose, the selection unit 7 transfers the necessary data regarding the selected satellites S1, S2, S3, S4 to the signal generator 20. This includes for example the ephemerides and the satellite name and optionally an exact time. As a result, the at least one signal generator 20 can artificially generate at least four navigation signals $4_1, 4_2, 4_3, 4_4$, each navigation signal $4_1, 4_2, 4_3, 4_4$ ideally no longer being distinguishable from the navigation signals $4_1, 4_2, 4_3, 4_4$ being broadcast by the actual satellites S1, S2, S3, S4.

By way of the at least four generated navigation signals $4_1, 4_2, 4_3, 4_4$ supplied to the preparation unit 2, the preparation unit 2 determines a location which a receiving device receiving all four of these navigation signals $4_1, 4_2, 4_3, 4_4$ would compute. Starting from this calculated location, which can of course be influenced by the signal generator 20, the preparation unit 2 time-shifts two, three or all of the at least four individual navigation signals $4_1, 4_2, 4_3, 4_4$ in a manner resulting in at least four target-location-dependent navigation signals, superposition of the four target-location-dependent navigation signals to form a modified summed navigation signal $6_1, 6_2, \ldots, 6_n$ giving the location of the at least one local position transmitter $3_1, 3_2, \ldots, 3_n$, or a target location which is positioned in radio range of the at least one local position transmitter $3_1, 3_2, \ldots, 3_n$ or is even selected as desired. The modified summed navigation signal $6_1, 6_2, \ldots, 6_n$ is subsequently supplied to the corresponding local position transmitter $3_1, 3_2, \ldots, 3_n$.

The preparation unit 2 preferably digitises the four navigation signals $4_1, 4_2, 4_3, 4_4$ supplied thereto. The delay, in other words the time-shift, of the at least four navigation signals $4_1, 4_2, 4_3, 4_4$ subsequently takes place digitally. This also applies to the overlap. However, it is also possible for the delay to take place in an analogue manner, in that the individual navigation signals $4_1, 4_2, 4_3, 4_4$ are delayed with respect to one another by means of delay lines which can be switched in and out.

The modified summed navigation signals $6_1, 6_2, \ldots, 6_n$ are a digital signal or an analogue signal. In the former case, the local position transmitters $3_1, 3_2, \ldots, 3_n$ have a digital/analogue converter, and preferably an amplifier and/or attenuation element. Otherwise, optionally, only an amplifier and/or attenuation element may be used.

The at least one signal generator 20 is formed preferably to generate the at least four navigation signals $4_1, 4_2, 4_3, 4_4$ in parallel. However, it would also be possible for the at least one signal generator 20 to generate the at least four navigation signals $4_1, 4_2, 4_3, 4_4$ in sequence, the preparation unit 2 additionally taking into account the time difference during generation when shifting the transmission times within the navigation signals $4_1, 4_2, 4_3, 4_4$.

It is also possible for the signal generator 20 solely to output a summed navigation signal which represents a superposition of the at least four navigation signals $4_1, 4_2, 4_3, 4_4$. In this case, the preparation unit 2 has to demultiplex the summed navigation signal supplied thereto accordingly so as to obtain therefrom the individual at least four navigation signals $4_1, 4_2, 4_3, 4_4$.

If a plurality of local position transmitters $3_1, 3_2, \ldots, 3_n$ are used, in particular inside one room, it is found that the broadcast modified summed navigation signals $6_1, 6_2, \ldots, 6_n$ thereof overlap inside the room. Therefore, in a situation of this type, when the modified summed navigation signal $6_1, 6_2, \ldots, 6_n$ is generated, satellites S1, S2, S3, S4 which are different entirely or at least in part are preferably used as a basis, in other words selected. This means that if at least two local position transmitters $3_1, 3_2, \ldots, 3_n$ are used for generating the modified summed navigation signal $6_1, 6_2, \ldots, 6_n$ of the first local position transmitter $3_1, 3_2, \ldots, 3_n$, satellites S1, S2, S3, S4 are selected which are not or which in part are not selected for generating the modified summed navigation signal $6_1, 6_2, \ldots, 6_n$ of the second local position transmitter or further local position transmitters $3_1, 3_2, \ldots, 3_n$.

The selection unit 7 of FIG. 2 is also connected to a memory unit 10 (not shown). Via the memory unit 10, the selection unit 7 queries all of the satellites S1, S2, S3, S4 which are in orbit above the location of the at least one local position transmitter $3_1, 3_2, \ldots, 3_n$. Using the visible satellites S1, S2, S3, S4, the selection unit 7 selects at least four of these. Criteria such as uniform distribution of the satellites S1, S2, S3, S4 in orbit above the location of the local position transmitters $3_1, 3_2, \ldots, 3_n$ are important here, in such a way that the most exact location determination possible, in particular the best altitude information possible, can be calculated from the received modified summed navigation signals $6_1, 6_2, \ldots, 6_n$ of the local position transmitters $3_1, 3_2, \ldots, 3_n$.

Figure 3:
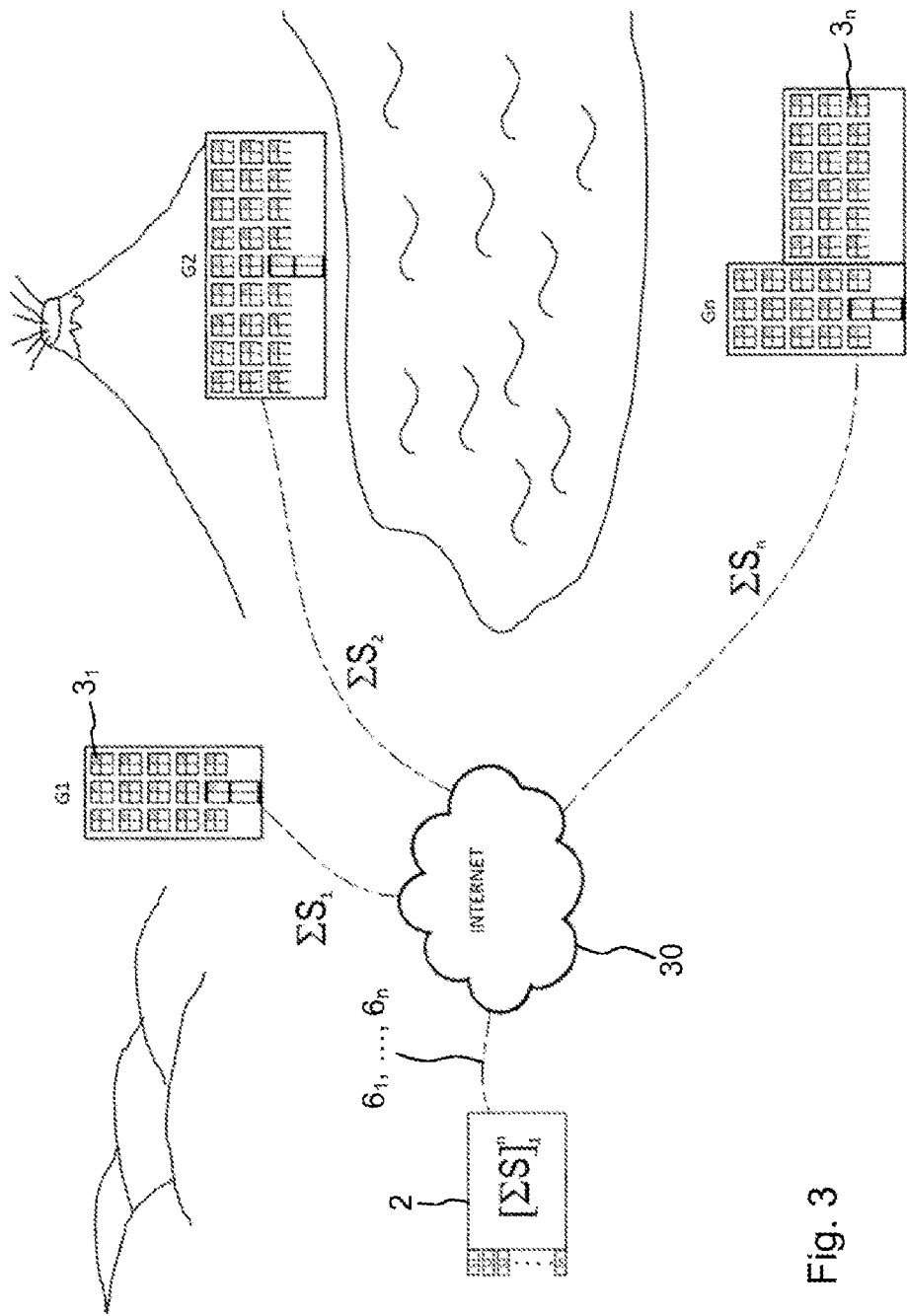
FIG. 3 is a further overview circuit diagram of the device according to the invention, which illustrates that the individual summed navigation signals can be conveyed to the local position transmitters via shared transport channels which are used with other services, such as the Internet.

FIG. 3 shows a further embodiment of the invention, in which it is again emphasised that a single preparation unit 2 can supply a multiplicity of different local position transmitters $3_1, 3_2, \ldots, 3_n$ with individual modified summed navigation signals $6_1, 6_2, \ldots, 6_n$. The generation of the modified summed navigation signals $6_1, 6_2, \ldots, 6_n$ by the preparation unit 2 and the broadcast of the modified summed navigation signals $6_1, 6_2, \ldots, 6_n$ by the local position transmitters $3_1, 3_2, \ldots, 3_n$ take place at spatially separated locations. The individual local position transmitters $3_1, 3_2, \ldots, 3_n$ need not even be located in the same house. The regions covered by the individual local position transmitters $3_1, 3_2, \ldots, 3_n$ may be a few metres apart or even (hundreds or thousands of) kilometres apart. The modified summed navigation signals $6_1, 6_2, \ldots, 6_n$ are transmitted to the associated local position transmitters $3_1, 3_2, \ldots, 3_n$ for example via a packet-based method, such as TCP/IP or UDP, using the Internet or intranet (for example via dark fibres). A plurality of local position transmitters $3_1, 3_2, \ldots, 3_n$ can be supplied with the associated modified summed navigation signals $6_1, 6_2, \ldots, 6_n$. In the simplest case, the local position transmitters $3_1, 3_2, \ldots, 3_n$, for example inside a building, are actuated by way of a pre-existing communications network. Preferably, they are also provided with power for operation via this communications network. For example the Power over LAN standard is suitable for this purpose. However, other, optionally proprietary interfaces may also be used.

A further advantage in the device for generating and providing position information is that the device 1 can be expanded as desired with further local position transmitters $3_1, 3_2, \ldots, 3_n$. For this purpose, it is merely necessary to adapt the software setup.

A user also has the option of registering his local position transmitter $3_1, 3_2, \ldots, 3_n$, which may for example be a home router, with a preparation unit 2 by conveying the exact location thereof. The preparation unit 2 subsequently continuously conveys the current modified summed navigation signals $6_1, 6_2, \ldots, 6_n$ for this location to said transmitter.

Figure 4:
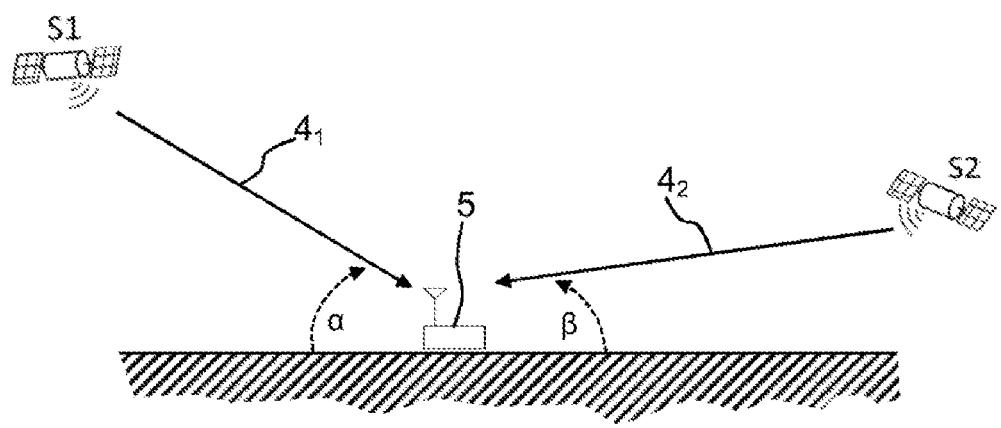
FIG. 4 is a simplified illustration of which satellites in space are selected by a selection unit.

FIG. 4 is a simplified drawing illustrating which satellites S1, S2, S3, S4 in orbit above the location of the local position transmitter $3_1, 3_2, \ldots, 3_n$ are selected by the selection unit 7. A GNSS receiver 5 and two example satellites S1 and S2 are shown. The navigation signal $4_1$ broadcast from the first satellite S1 towards the GNSS receiver 5 is incident on the GNSS receiver 5 at an angle α to the ground. A second satellite S2 broadcasts a second navigation signal $4_2$ towards the GNSS receiver 5. This second navigation signal $4_2$ is incident on the GNSS receiver 5 at an angle β to the ground. When selecting, the selection unit 7 solely takes into account satellites S1, S2, S3, S4 which are broadcasting a navigation signal $4_1$, $4_2$, $4_3$, $4_4$ which is incident at an angle of more than 5°, preferably of more than 10° and more preferably of more than 20° to the ground at the location of the local position transmitter $3_1$, $3_2$, . . . , $3_n$, which may also be the location of the GNSS receiver 5. Satellite signals, in other words navigation signals $4_1$, $4_2$, $4_3$, $4_4$, which are incident at a smaller angle are discarded by the selection unit 7. This is because some receiving devices would not use such navigation signals $4_1$, $4_2$, $4_3$, $4_4$ for position determination because this can be an indication of fading.

In the embodiment of FIG. 4, the selection unit 7 would not take into account the second navigation signal $4_2$ received from the satellite S2. The satellite S2 would not be selected by the selection unit 7. The selection unit 7 would solely select the satellite S1 and further satellites (not shown) of which the satellite signals, in other words the navigation signals $4_1$, $4_3$, $4_4$, were incident at a greater angle to the ground at the GNSS receiver 5.

Figure 5:
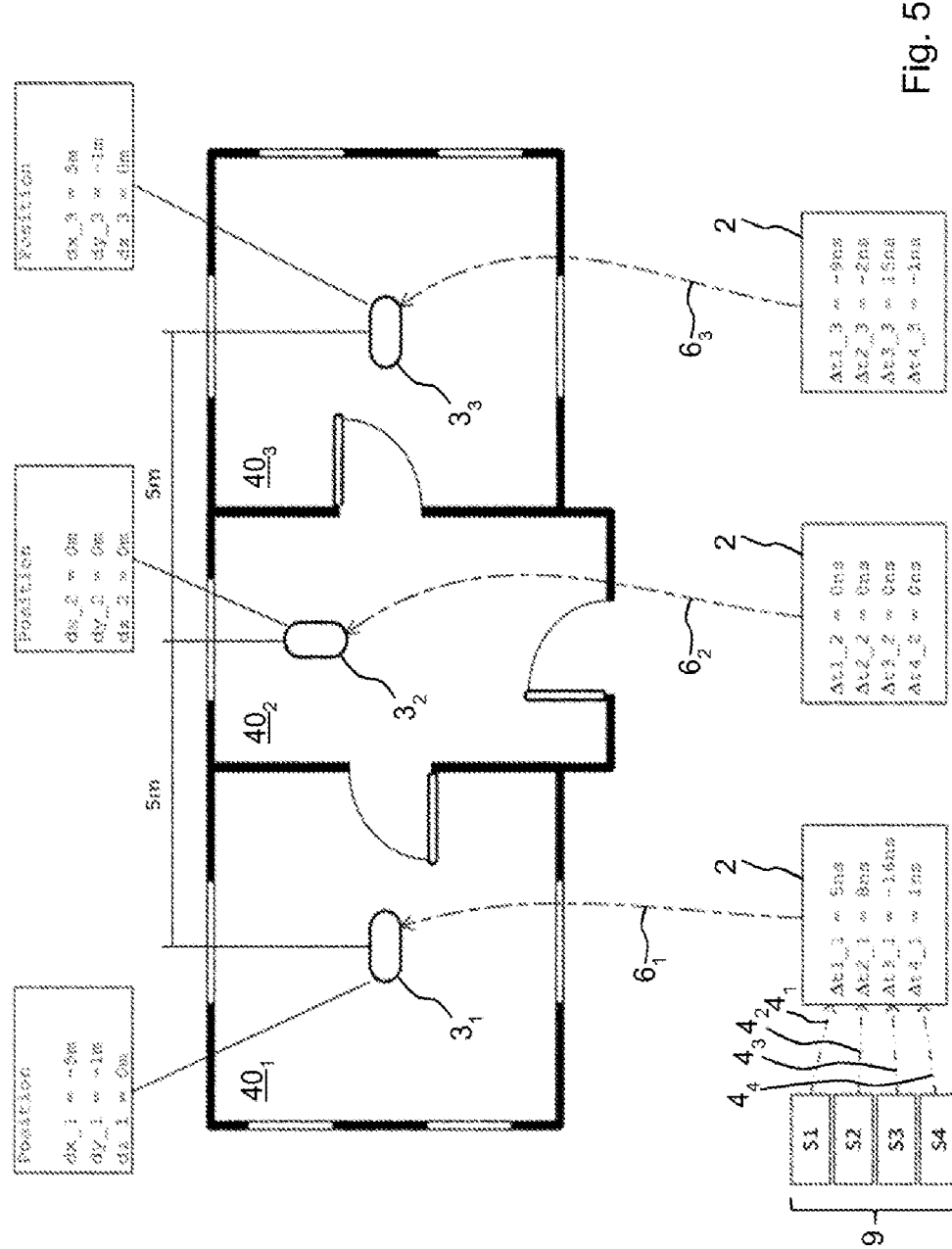
FIG. 5 is a simplified illustration showing how a modified summed navigation signal is generated and conveyed to various local position transmitters within different rooms.

FIG. 5 is a simplified drawing showing how a modified summed navigation signal $6_1$, $6_2$, . . . , $6_n$ is generated and conveyed to different local position transmitters $3_1$, $3_2$, . . . , $3_n$ inside different rooms $40_1$, $40_2$, $40_3$.

The embodiment of FIG. 5 shows the footprints of three rooms $40_1$, $40_2$, $40_3$. A local position transmitter $3_1$, $3_2$, $3_3$ is accommodated in each room $40_1$, $40_2$, $40_3$. For each local position transmitter $3_1$, $3_2$, $3_3$, the position thereof with respect to a reference point is exactly known. The reference point is for example the position of a GNSS receiver 5 or the position of a local position transmitter $3_1$, $3_2$, $3_3$. In the embodiment of FIG. 5, the position of the second local position transmitter $3_2$ has been selected as the reference point. Navigation signals $4_1$, $4_2$, $4_3$, $4_4$ which are supplied to the preparation unit 2 and for which the position information obtainable therefrom, in other words target location coordinates on the basis of the global navigation satellite system, already correspond to the location of the second local position transmitter $3_2$ or to a position in the room, in other words in radio range, of the second local position transmitter $3_2$ do not have to be delayed for said transmitter. However, the preparation unit 2 has to delay, in other words time-shift, these navigation signals $4_1$, $4_2$, $4_3$, $4_4$ for the first local position transmitter $3_1$ and the third local position transmitter $3_3$. In this example, it is necessary to shift the first navigation signal $4_1$ by +5 ns, the second navigation signal $4_2$ by +8 ns, the third navigation signal $4_3$ by −16 ns and the fourth navigation signal $4_4$ by +1 ns. Other embodiments are of course possible. The modified summed navigation signal $6_1$ generated from these modified navigation signals by the preparation unit 2 is supplied to the first local position transmitter $3_1$. Receivers which are arranged inside the first room $40_1$ can receive the position of the first local position transmitter $3_1$. The time shift can of course also take place in such a way that a target location which is in radio range of the first local position transmitter $3_1$ is sought.

The same also applies to the third local position receiver $3_3$. The preparation unit 2 delays the received navigation signals $4_1$, $4_2$, $4_3$, $4_4$ accordingly.

In the embodiment of FIG. 5, the at least one signal generator 20 is again used. However, it would also be possible for navigation signals $4_1$, $4_2$, $4_3$, $4_4$ received from real satellites S1, S2, S3, S4 to be conveyed to the preparation unit 2.

The at least one local position transmitter $3_1$, $3_2$, . . . , $3_n$ may also be part of a transceiver unit which is in turn part of a mobile radio station, in other words a mobile radio base station. A mobile radio station of this type may be what is known as an "indoor coverage" unit. For this purpose, the preparation unit 2 passes the modified summed navigation signal $6_1$, $6_2$, . . . , $6_n$ via the same connection via which the transceiver unit of the mobile radio station or mobile radio base station also receives the data thereof. Advantageously, a pre-existing infrastructure can therefore additionally be used. Preferably, a communications-orientated protocol is used. However, a packet-based protocol for actuating the local position transmitter $3_1$, $3_2$, . . . , $3_n$ would also be conceivable.

It is further possible to integrate a GNSS receiver into or onto the local position transmitter $3_1$, $3_2$, $3_3$ . . . , $3_n$, which receives the modified summed navigation signal $6_1$, $6_2$, $6_3$ . . . , $6_n$, determines the position thereof and provides said position. This position, which is determined by the GNSS receiver, can be compared with the target location. There is thus a control and regulation option in the overall system.

Figure 6:
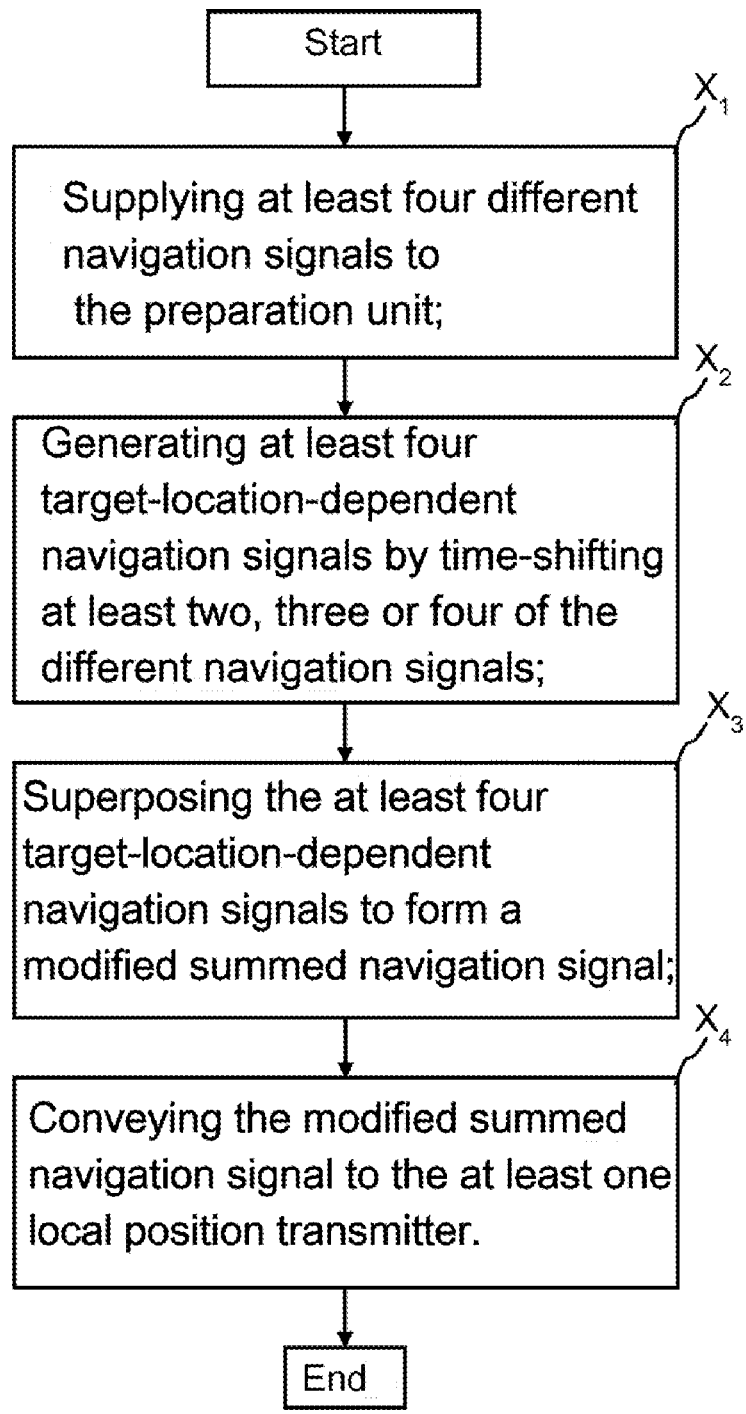
FIG. 6 is a flow chart, which illustrates the generation of a summed navigation signal.

FIG. 6 is a flow chart which illustrates how the modified summed navigation signal $6_1$, $6_2$, . . . , $6_n$ is generated. In a first method step $X_1$, at least four different navigation signals $4_1$, $4_2$, $4_3$, $4_4$ are supplied to the preparation unit 2, each of which corresponds to a satellite signal on the basis of the global navigation satellite system.

In a second method step $X_2$, the preparation unit 2 generates target-location-dependent navigation signals. This is achieved in that at least two, three or all four different navigation signals $4_1$, $4_2$, $4_3$, $4_4$ are time-shifted in such a way that the position information obtainable therefrom on the basis of the global navigation satellite system corresponds to the target location.

In a third method step $X_3$, the at least four target-location-dependent navigation signals are superposed to form a modified summed navigation signal $6_1$, $6_2$, $6_3$ . . . , $6_n$.

Finally, in a fourth method step $X_4$, the modified summed navigation signal $6_1$, $6_2$, $6_3$ . . . , $6_n$ is conveyed to the at least one local position transmitter $3_1$, $3_2$, $3_3$ . . . , $3_n$, which subsequently broadcasts it.

The navigation signal $4_1$, $4_2$, $4_3$, $4_4$ is a signal which corresponds to a satellite signal on the basis of the global navigation satellite system and meets the associated standard.

The target-location-dependent navigation signal is the navigation signal $4_1$, $4_2$, $4_3$, $4_4$ which has been time-shifted with respect to the navigation signal $4_1$, $4_2$, $4_3$, $4_4$.

The modified summed navigation signal $6_1$, $6_2$, $6_3$, . . . , $6_n$ is a superposition of the target-location-dependent navigation signals.

The modified summed navigation signal ($6_1$, $6_2$, $6_3$ . . . , $6_n$) can be prepared in terms of the signal level thereof in such a way that it can be received and evaluated well by the receivers in buildings, tunnels, etc. The signal level is preferably set in such a way that receivers outside the building ideally to not receive it.

The invention is not limited to the embodiments described. Within the scope of the invention, all described and/or illustrated features can be combined in any desired manner.

The invention claimed is:

1. Method for generating and providing individual pieces of position information for location determination on the basis of the global navigation satellite system, comprising:
   supplying at least four different navigation signals to a time-shifter, each signal corresponding to a satellite signal on the basis of the global navigation satellite system;

generating at least four target-location-dependent navigation signals by the time-shifter time-shifting at least two, three or four different navigation signals, in such a way that the position information obtainable therefrom on the basis of the global navigation satellite system corresponds to the target location;

superposing the at least four target-location-dependent navigation signals to form a modified summed navigation signal;

conveying the modified summed navigation signal to at least one local position transmitter; and wherein the generating, superposing and conveying are carried out individually for each of plural local position transmitters, and the time shift in the generating is adapted individually to each target location.

2. Method according to claim 1, wherein the local position transmitter and a preparation unit are accommodated in mutually separated housings, the generation of the digital summed navigation signal taking place centrally, exclusively in the preparation unit, for all local position transmitters connected to the preparation unit, and the associated summed navigation signal being transmitted digitally to the associated local position transmitter.

3. Method according to claim 1, wherein the target location is a location in radio range of the associated local position transmitter.

4. Method according to claim 1, further including:
broadcasting the associated modified summed navigation signal by way of the local position transmitter.

5. Method according to claim 1, further including:
selecting at least four satellites which are in orbit above the location of the at least one local position transmitter; and
a) receiving at least four real satellite signals of the at least four selected satellites, and/or
generating at least four artificial satellite signals modelled on the real satellite signals of the at least four selected satellites,
the at least four received real and/or at least four received generated satellite signals being the navigation signals supplied to the preparation unit in the method step of supplying; or
b) in a combined manner, receiving real satellite signals from one or more of the at least four selected satellites and generating artificial satellite signals modelled on the real satellite signals of one or more of the at least four selected satellites, the received real and/or received generated satellite signals being the supplied navigation signals, and overall at least four navigation signals having to be present.

6. Method according to claim 5, wherein, in the selecting, the satellites are selected which are furthest away from one another and/or which broadcast a navigation signal which is incident on the ground at an angle of more than 5°, at the location of the local position transmitter and/or which are preferably arranged uniformly with respect to one another.

7. Method according to claim 5, wherein, in the selecting, satellites which are different entirely or at least in part are selected for the first local position transmitter and for each further local position transmitter.

8. Method according to claim 5, wherein at least one local position transmitter has a plurality of mutually spatially separated antennas, and
a) a modified summed navigation signal is broadcast via each antenna, satellites which are different entirely or at least in part being selected for the at least four different navigation signals of each modified summed navigation signal, or
b) the modified summed navigation signal is broadcast via the plurality of mutually spatially separated antennas in succession.

9. Method according to claim 5, wherein information regarding a transmission location contained in each of the at least four target-location-dependent navigation signals comprises the ephemerides of the selected satellites, these being no more than five minutes old, and/or in that the associated modified summed navigation signals broadcast by the local position transmitters are synchronous with the real satellite signals broadcast to the location of the associated local position transmitter by the at least four selected satellites.

10. Method according to claim 5, wherein:
using at least one receiver so as, in the receiving, to receive the at least four real satellite signals of the at least four selected satellites; and
the at least one receiver being a directional antenna and/or an antenna array and/or a mirror and/or a microwave lens; or
the at least one receiver being a signal generator.

11. Method according to claim 10, further including:
using at least four antenna arrays and/or at least four directional antennas and/or at least four mirrors and/or at least four microwave lenses; and
using a controller for orientating the at least four antenna arrays and/or the at least four directional antennas and/or at least four mirrors and/or the at least four microwave lenses; and
orientating and tracking one of the at least four antenna arrays onto each of the at least four satellites selected in the selecting, by beamforming; and/or
orientating and tracking one of the at least four directional antennas or one of the at least four mirrors or one of the at least four microwave lenses onto each of the at least four satellites selected in the selecting, using an orientation and tracking unit.

12. Method according to claim 11, further including:
using a GNSS receiver which is connected to the control unit and which conveys location data for the at least four satellites selected in the selecting to the controller; and/or
conveying location data for the at least four satellites selected in the method step of selecting from a memory connected to the controller to the controller.

13. Method according to claim 1, wherein:
at least one of the local position transmitters is part of a transceiver which is part of a mobile radio station, and/or the connection between a preparation unit and at least one of the local position transmitters is a connection configured to supply data to a transceiver of a mobile radio station; and/or
the local position transmitters are at least in part connected to the preparation unit via a jointly used data connection.

14. Device for generating and providing individual pieces of position information for location determination on the basis of the global navigation satellite system, comprising:
a time-shifter and at least two local position transmitters, the local position transmitters being connected to the time-shifter;
the time-shifter is formed in such a way that at least four different navigation signals are supplied thereto, each of which corresponds to a satellite signal on the basis of the global navigation satellite system;

the time-shifter is formed to generate at least four target-location-dependent navigation signals by time-shifting at least two, three or all four different navigation signals by way of the time-shifter, in such a way that the position information obtainable therefrom on the basis of the global navigation satellite systems corresponds to the target location;

the time-shifter is configured in such a way that it superposes the at least four target-location-dependent navigation signals to form a modified summed navigation signal;

the time-shifter is configured in such a way that it conveys the modified summed navigation signal to the local position transmitters; and the time-shifter is configured to generate, for each local position transmitter connected thereto, an individually adapted modified summed navigation signal.

15. Device according to claim 14, wherein the local position transmitter and the time-shifter are accommodated in mutually separated housings, the generation of the digital summed navigation signal taking place centrally, exclusively in the preparation unit, for all local position transmitters connected to the time-shifter, and the associated summed navigation signal being transmitted digitally to the associated local position transmitter.

16. Device according to claim 14, wherein the at least one position transmitter is formed to broadcast the modified summed navigation signal transmitted thereto; and/or in that the target location is in radio range of the at least one local position transmitter.

17. Device according to claim 14, wherein:

the device further comprises a selector which is formed to select at least four satellites which are in orbit above the location of the at least one local position transmitter; and/or the time-shifter is configured in such a way that it can receive at least four real satellite signals of the at least four selected satellites; or the time-shifter is configured in such a way that it can generate at least four artificial satellite signals modelled on the real satellite signals of the at least four selected satellites; or the time-shifter is configured so as to receive both real satellite signals from one or more of the at least four selected satellites and artificially generated satellite signals modelled on the real satellite signals of one or more of the at least four selected satellites; and/or the received real and/or received generated satellite signals are the navigation signals.

18. Device according to claim 17, wherein the selector is configured so as to select the satellites which are furthest away from one another and/or which broadcast a satellite signal which is incident on the ground at an angle of more than 5°, at the location of the local position transmitter and/or which are arranged uniformly with respect to one another.

19. Device according to claim 17, wherein the selector is configured in such a way that it selects satellites which are different entirely or at least in part for the first local position transmitter and for each further local position transmitter.

20. Device according to claim 17, wherein at least one local position transmitter has a plurality of mutually spatially separated antennas, and a) in that a modified summed navigation signal is broadcast via each antenna, the selector being configured in such a way that satellites which are different entirely or at least in part are selected for the at least four different navigation signals of each modified summed navigation signal; or b) in that the modified summed navigation signal is broadcast via the plurality of mutually spatially separated antennas in succession.

21. Device according to claim 17, wherein information regarding a transmission location contained in each of the at least four target-location-dependent navigation signals comprises the ephemerides of the satellites selected by the selector, these being no more than five minutes old, and/or in that the associated modified summed navigation signals broadcast by the local position transmitters are synchronous with the real satellite signals broadcast to the location of the local position transmitter by the at least four selected satellites.

22. Device according to claim 17, further comprising:

at least one receiver, which receives the at least four real satellite signals of the at least four satellites selected by the selector, is connected to the time-shifter; and the at least one receiver being a directional antenna and/or an antenna array and/or a mirror and/or a microwave lens; and/or the at least one receiver being a signal generator which generates the artificially generated satellite signals.

23. Device according to claim 22, wherein:

the at least one receiver comprises at least four antenna arrays and/or at least four directional antennas and/or at least four mirrors and/or at least four microwave lenses; and the device further comprises a controller, which is configured to orientate and track the at least four antenna arrays and/or the at least four directional antennas and/or at the least four mirrors and/or the at least four microwave lenses onto the at least four satellites selected by the selector.

24. Device according to claim 23, wherein:

the controller is configured to orientate and track one of the at least four antenna arrays onto each of the at least four satellites selected by the selector, by beamforming; and/or an orientation tracker which is connected to the controller, the controller being formed to actuate the orientation tracker so as to orientate and track one of the at least four directional antennas or one of the at least four mirrors or one of the at least four microwave lenses onto each of the at least four satellites selected by the selector.

25. Device according to claim 23, further comprising:

a GNSS receiver which is connected to the controller and which is configured in such a way that it conveys location data for the at least four satellites selected by the selector to the controller; and/or the controller is configured in such a way that it conveys location data for the at least four satellites selected by the selector from a memory connected to said controller to the controller.

26. Device according to claim 14, wherein at least one of the local position transmitters is part of a transceiver which is part of a mobile radio station; and/or in that the connection between the time-shifter and at least one of the local position transmitters is a connection by means of which a transceiver of a mobile radio station is also supplied with data; and/or in that the local position transmitters are at least in part connected to the time-shifter via a jointly used data connection.

* * * * *